United States Patent
Henderson

(10) Patent No.: US 11,282,142 B2
(45) Date of Patent: Mar. 22, 2022

(54) ISSUE IDENTIFICATION DATABASE SYSTEM

(71) Applicant: MuniMatch Corporation, Geyserville, CA (US)

(72) Inventor: Mary P. Henderson, Geyserville, CA (US)

(73) Assignee: MUNIMATCH CORPORATION, Geyserville, CA (US)

( * ) Notice: Subject to any disclaimer, the term of this patent is extended or adjusted under 35 U.S.C. 154(b) by 100 days.

(21) Appl. No.: 16/269,431

(22) Filed: Feb. 6, 2019

(65) Prior Publication Data

US 2019/0244295 A1    Aug. 8, 2019

Related U.S. Application Data

(60) Provisional application No. 62/626,768, filed on Feb. 6, 2018.

(51) Int. Cl.
*G06Q 40/06* (2012.01)
*G06F 16/23* (2019.01)
*G06N 5/02* (2006.01)

(52) U.S. Cl.
CPC ......... *G06Q 40/06* (2013.01); *G06F 16/2365* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 7,437,344 B2 | 10/2008 | Peyrelevade | |
| 8,606,632 B2 | 12/2013 | Libman | |
| 2003/0149654 A1* | 8/2003 | Harrington | G06Q 40/04 705/37 |
| 2005/0283833 A1* | 12/2005 | Lalonde | H04L 63/1441 726/22 |
| 2006/0074788 A1 | 4/2006 | Grizack et al. | |
| 2011/0246391 A1* | 10/2011 | Henderson | G06Q 40/04 705/36 R |
| 2014/0207652 A1 | 7/2014 | LaQuinta et al. | |
| 2016/0247228 A1* | 8/2016 | Connolly | G06Q 40/06 |
| 2017/0301015 A1 | 10/2017 | Tunnell | |

* cited by examiner

*Primary Examiner* — Bennett M Sigmond
*Assistant Examiner* — Marla Hudson
(74) *Attorney, Agent, or Firm* — Nixon & Vanderhye

(57) ABSTRACT

A computer method and system designed to use artificial intelligence data (AI), alternative data, Internet of Things (IoT), biometric data, and machine learning to determine the suitability of a specific investment product for an interested investor while vetting and validating or rejecting a buyer on behalf of a seller prior to entering into a transaction for a specific buyer type or characteristic or value of an order.

6 Claims, 5 Drawing Sheets

ISSUE IDENTIFICATION DATABASE SYSTEM

BACKGROUND OF INVENTION

Fractured computer methods and telecommunications systems create time delays in finding suitable investments, especially in new issues with short order periods, resulting in unsuccessful transactions (i.e. "sold Out"). To buy a new issue security (Bonds or an Initial Public Offering (IPO), first an investor needs notification by her broker or financial representative via either phone or email, of its availability, assuming it meets certain investor investment criteria and objectives. If the investor is interested in purchasing the product, and determines it meets her own personal investment objectives and goals (changing constantly based on daily activities and experiences), the broker and investor will make a decision to monitor the Issue in advance of the sale and together place conditional orders for certain specific maturities and pricing to meet investor objectives with any allocations to be made later. But this rarely happens due to the brokers lost opportunity costs, low profit margins, and general time constraints, causing self-directed investors to find new issue public announcements themselves by either searching online or print ads. However, finding and participating in new issue offerings without a broker notification is difficult. If the investor is not contacted by her broker or a financial professional, yet finds an new investment product to buy through a public or online announcement, there is only a day or two to research and review the product, find a broker, open an account, and place an order prior to the 2 hour order and pricing time frame. The new issue will generally conclude its offering within days of a public announcement, giving retail investors little time to fully participate.

Even though the retail investor is often given preferential treatment and high order priority by the issuers, the underwriting process for new issues and/or IPO's (Initial Public Offerings) (collectively "New Issues") handicaps the interested, self-directed investor primarily due to 1) the lack of familiarity with the Sellers (and vice versa), including the difficulty for Sellers to fully "know their (new) customers" in a money and time sensitive situation and, 2) again, the very short order period, creating an uncompetitive environment to purchase a new financial product.

For a Seller, vetting new investors is a cumbersome process. Often spread over multiple bank accounts and financial institutions, it is difficult to correctly assess the wealth capacity and investment objectives of an individual in a time sensitive situation. Underwriters are often required to take reasonable measures to ensure that retail clients are bona fide. The issuer may wish to impose additional conditions to ensure that orders received during the retail order period are in fact valid orders.

It is difficult to place orders in advance of an IPO or New issue without the right credentials since this process may take days, or even weeks, preventing an interested investor from fully participating in the New Issue or IPO mostly because of data disorganization and a slow trend as an industry to see the benefits of some of this technology.

SUMMARY OF THE INVENTION

The invention relates to methods, combinations, apparatuses, systems, algorithms, the internet of things, API's, machine learning, web-based networks, and security characteristics in order to make appropriate real time financial product investment recommendations, such as for New Issue Bonds and IPO's, for the Investor (Buyer), while making reasonable assurances of investor qualifications to the Seller. Although the invention, in its broadest sense is not limited to any particular products, for purposes of explaining some inventive features, the invention is described herein in connection to investment products, specifically in the primary marketplace (i.e. IPO's, New Issue Bonds, etc).

Investment advice may include multiple recommendations for a direct investment in an appropriate product on an unbiased platform in advance of a sale. To continue to invest, user identification, financial status, and objectives and truthfulness will be vetted in advance of placing an order, comparing user inputs to multiple sources, including but not limited to social data collected from alternative data and IoT. Users site activity and modified data is instantly reflected in real time recommendations.

The method compiles a comprehensive database of unbiased financial products to allow selection and purchase of new issues, or individual securities, or financial products investments based on intelligent preferences, financial status and unique demographics, using the internet of things to a set of anonymous, digital users. The AI results will evolve and improve as more information is provided, resulting in more refined and better results to eliminate friction between the Buyers and Sellers in a shorter time frame. The experience becomes simpler, more secure and seamless to the User.

In a matchmaking system and (pre) ordering system for timely investments on demand, a computer solution uses match methods, AI technology, search engine, machine learning and algorithms to identify suitable financial products in advance of sale or for any product that is (or will be) for sale at the same price at the same time from multiple vendors by quantifying experiences and values into data characteristics.

By deploying an AI engine on a web-based application to aid in determining and identifying investment products related to user-specific information, the Buyer receives only selective, customized results for product announcements unique to her own investment goals and values, maximizing probabilities of a successful transaction.

This computer-related system will dramatically shorten the timeline to purchase a (financial) product by streamlining online activities into a seamless method, especially for, but not limited to, time sensitive purchases. AI will look at thousands of quantitative and qualitative parameters for one single application not possible for a human. By expediting the investment advice and gathering user data, ML is stream lining the entire investment process.

VIP System

The present disclosure provides for an online method and system in which sellers can more quickly pre-qualify potential types of buyers (and characteristics) prior to a sale of a financial product while buyers can reduce transaction approval (or rejection) time for a pre-selected product. The invention expedites the time it takes to find and learn about a new issue from days down to minutes by pre-qualifying buyers in advance of a sale.

For sellers, this invention is a computer solution to expedite the pre-screening of investors (buyers) for a specific investment with reasonable assurance of buyer type (and other characteristics) provided to seller in order to better vet retail orders in time for priority treatment from sellers. New account documentation is time-consuming and error-prone but this invention allows for faster, cheaper and error free execution, using API, AI and other alternate data inputs.

It is especially useful with any new issue/IPO product where a very short order period—and fragmented approval system—often hinders many buyers from participating. This invention automates the vetting process, processing account applications in mere seconds using AI-powered algorithms.

The system and method will create a vetting "classifier", an algorithm to approve the VIP application prior to placing an order. Using AI, the seller will receive reasonable assurances of accurate data provided. The VIP classifier will learn from past site data inputs, site activity, leverage current information inputs, and quantify and qualify user data.

Using AI, IoT, Social Media, Social Data, Biometric data, speech recognition, facial recognition and language processing, the System will compare User data information to User input, searches and viewing to determine a level of truthfulness regarding investment experience, objectives, and other profile information, also improving data security by identifying fraudulent responses and suspicious viewing and/or order history. Conflicting and/or suspicious results will cause the VIP User to be rejected, subject to profile and/or product selection modification.

Vetting, as defined here is in making a careful and critical examination of the Product; vetting the User thoroughly, especially in order to ensure that they are suitable for an action requiring a certain type of Buyer and/or a level of truthfulness in vetting and/or verifying specific financial status or demographic locations; to appraise, verify, or check for accuracy, authenticity, validity, size of order, etc.

While the invention is exemplified and discussed herein with reference to the primary marketplace, i.e. New Issues and IPO's, those skilled in the art will appreciate that the present invention is equally applicable to other types of securities and debt instruments, such as preferred stock, corporate bonds, municipal bonds, Mutual Funds, ETF's, CD's etc. . . . . In addition, this invention is also applicable to any Product where multiple vendors (Sellers) are selling the same product at same time at same price to a select buyer type(s) and characteristics or where a pre-qualification for a set of buyers is required.

DETAILED DESCRIPTION OF THE INVENTION

Figure 1:
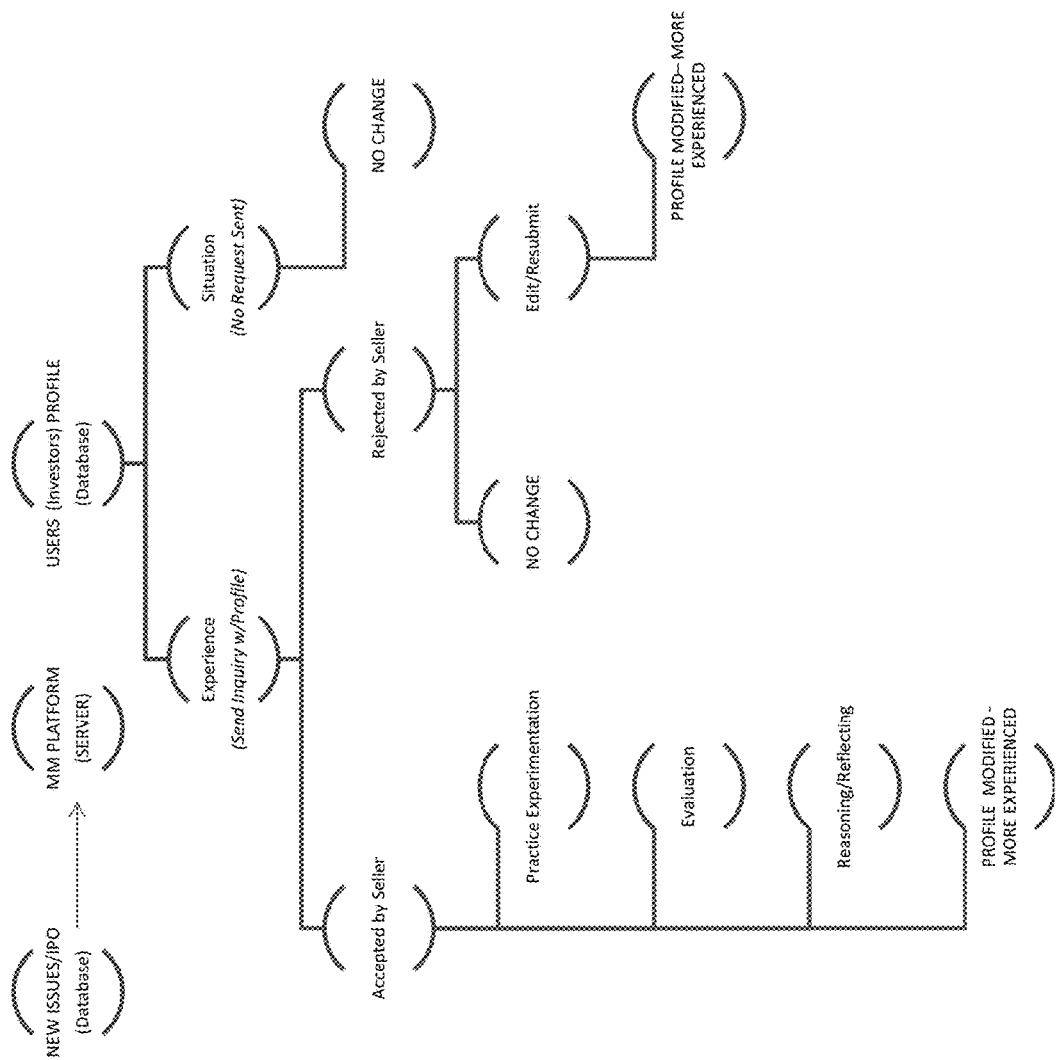
FIG. 1 is a website/Cloud map schematically showing computer display interfaces in accordance with one implementation of the invention.
Figure 2:
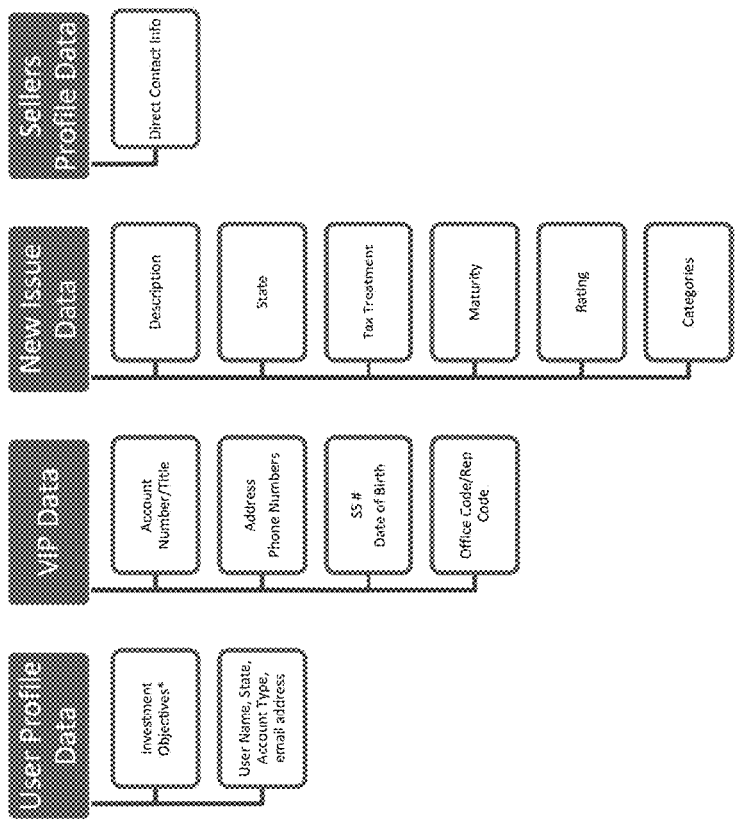
FIG. 2 is an artificial intelligence map showing computer display interface and processor in accordance with one of the invention.
Figure 3:
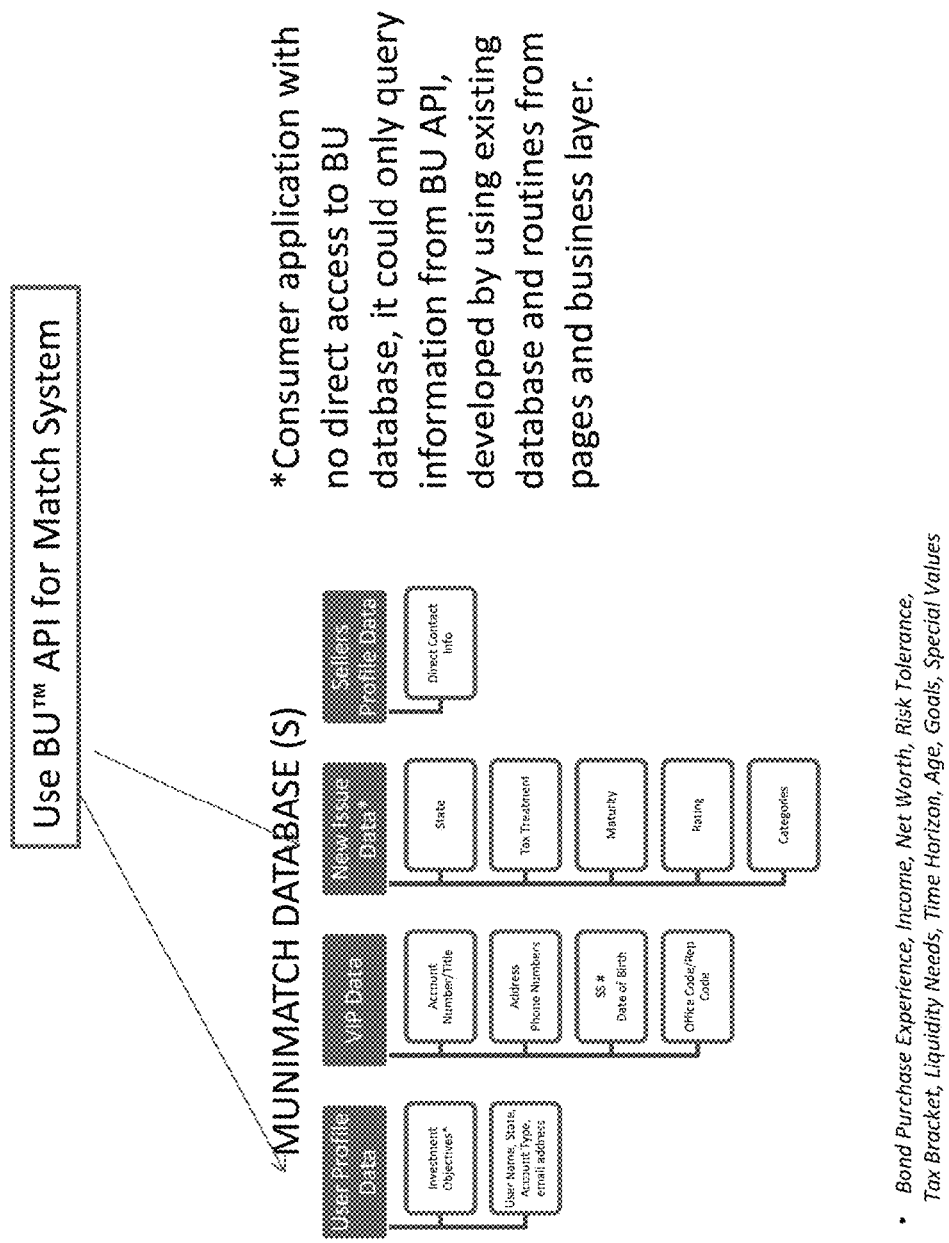
FIG. 3 is an artificial intelligence map showing computer interface for investment platform in accordance with one of the invention
Figure 4:
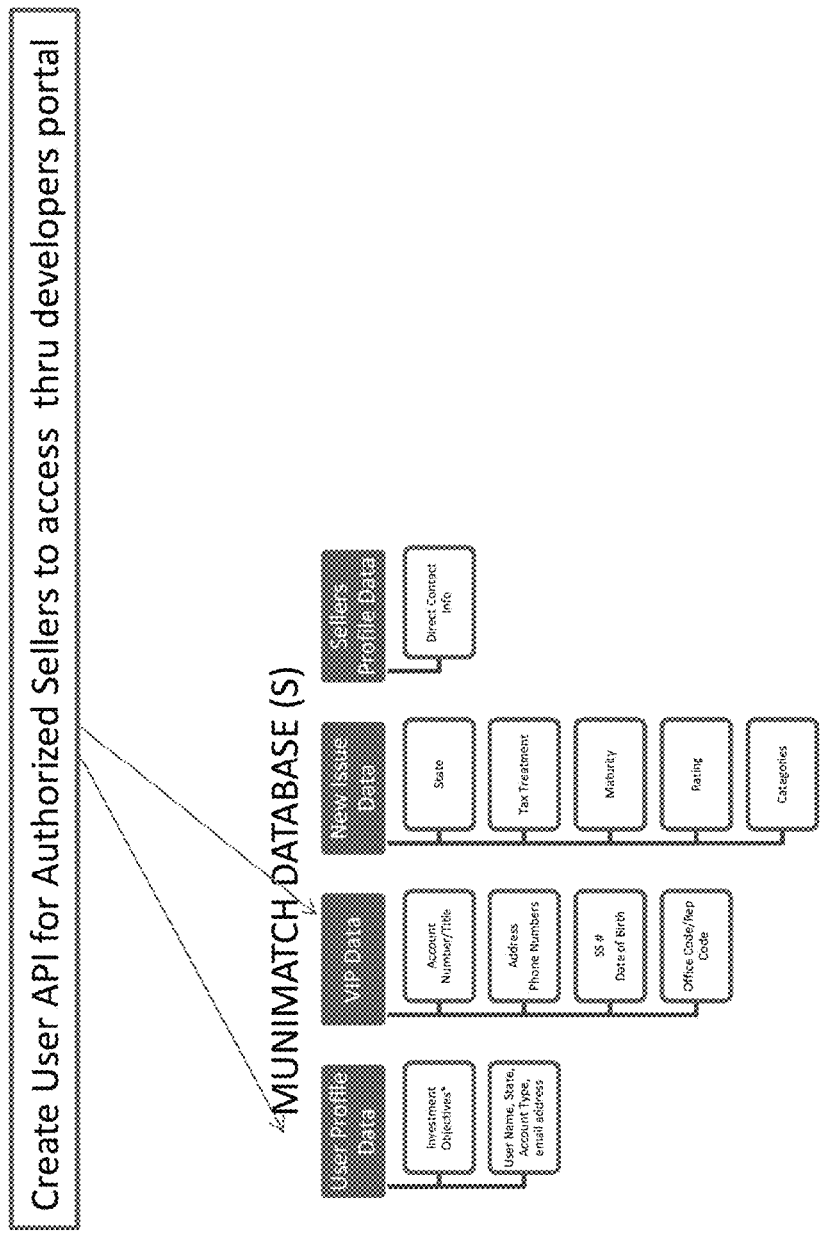
FIG. 4 is an artificial intelligence map showing computer interface for investment platform in accordance with one of the invention.
Figure 5:
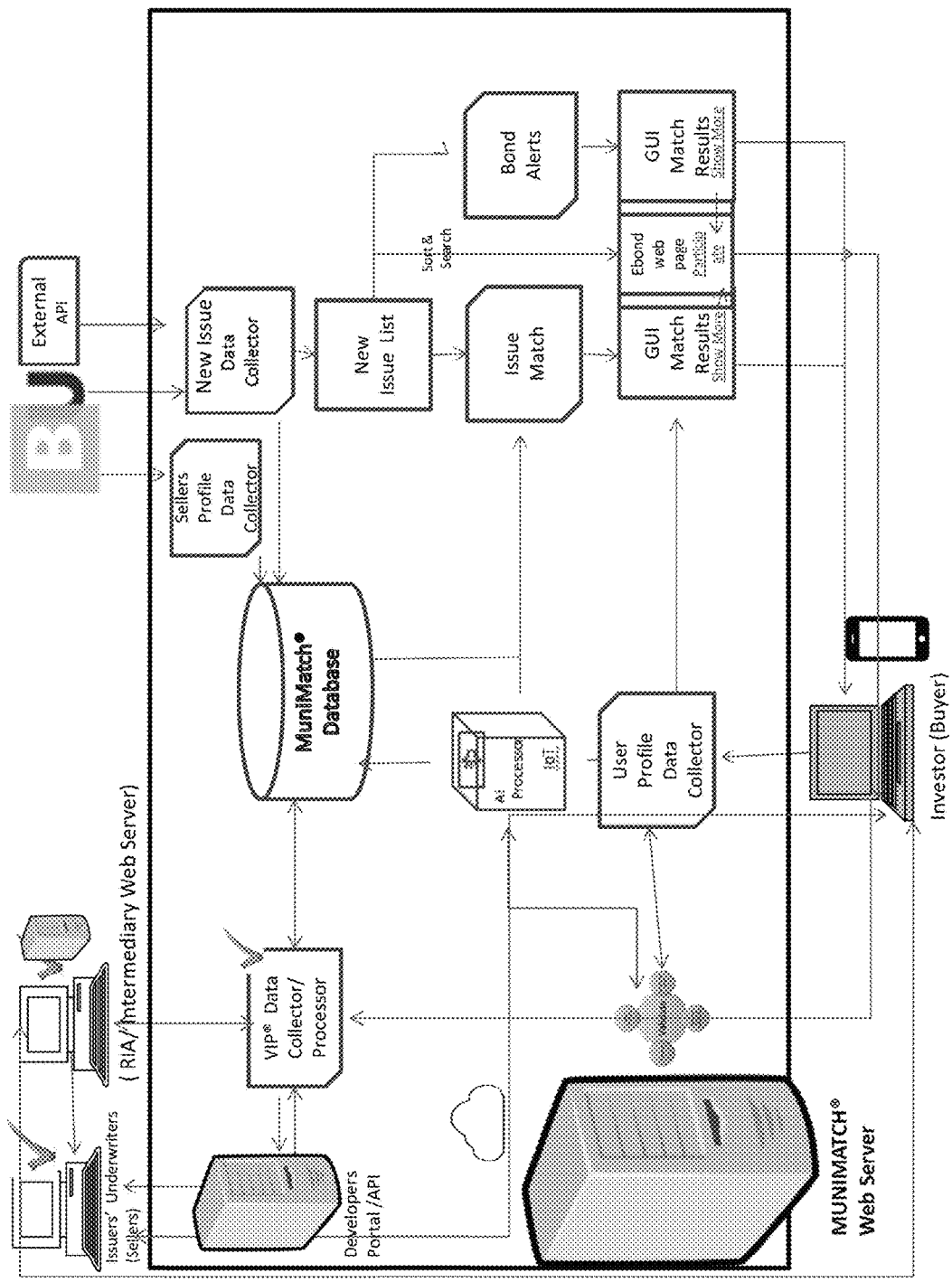
FIG. 5 is a flow chart of the invention showing the hardware, participants, and data.

This invention provides a quantitative system and method for qualifying interested investors prior to purchase and/or assigning an industry-defined value to each pre-order of a specific security (the "Valuable Investors Program", or "VIP" thereby increasing the speed and success at which qualified Investors can find and purchase suitable new securities, taking only minutes to approve or reject a Retail Investor versus weeks of search, due diligence, submission and approval of documents only to miss the order period for the investment or not be approved for purchase. The machine learning and deep learning will spot risks and fraud which have historically been impossible to track.

To summarize, incompatible computer systems between the Buyers and Sellers, as well as slow human processing and financial communication methods, make it difficult for the average investor to participate in the advantageous primary marketplace.

The invention is to allow computers and online devices to shortcut the friction in Investor participation during the order period for a specific security by vetting both the security for the Buyer in advance of the Sale and the identification of the Buyer for the Seller to "validate" each Request in advance of the Product Sale Date, thereby reducing the time it takes to place an order down from days to minutes.

This invention allows for a 1) potential investor (the "Buyer") to participate in a New Issue by facilitating a matching system ("MuniMatch") for investment products based on an investors investment criteria and then 2) providing Sellers with a System to provide reasonable Buyer assurances to expedite the processing time for Buyers to place an order on a specific New Issue in advance of a Sale on an online device by pre-qualifying (or "Vetting") the potential Investor as a "Retail Investor" (or not) ("Vetting Investor Program" or the "VIP" Method) for the specific financial product.

Additional scoring levels to further identify the Investors background, identification, and financial health and wealth may also be provided, upon request of the Seller with approval by the Buyer. The score ("VIP Score") may be distributed publicly or privately, through any acceptable, state-of-the-art communication method, at the Investors direction, prior to a specific New Issue or IPO.

This invention reduces the time required to go back and forth between buyers and sellers prior to a Sale, in multiple communication and computer modes, with constantly changing, conflicting data, thereby reducing transaction time.

The present Invention relates generally to the field of computer-assisted business methods, including cloud and web-based services, and to systems for implementing such methods. Specifically, the Invention relates to computer-based methods for supporting and coordinating any investor pre-qualification requirements imposed by the Issuer and/or Syndicate Member(s) of an Initial Public Offering (IPO) or New Issue to multiple, anonymous, investors, allowing more (individual) investors to participate in IPO's and New Issues of all types of new securities and debt instruments, such as preferred stock, corporate bonds, municipal bonds, etc . . . (Collectively called "New Issues"), regardless of brokerage firm affiliation or number of Syndicate Members.

Therefore, this invention provides for any potential investors to view, search and match to investment opportunities in advance of the sale while the ID validation method for VIP Users provides a seamless order system with the Sellers.

Although the Invention is discussed herein specific to New Issue Bonds, it applies equally to other types of Initial Public offerings (IPO's) for other financial securities. I.e. Also, the Invention applies to marketing any product to multiple consumers simultaneously for a product that is offered by multiple vendors at exactly the same price "Net Offering Price").

In one embodiment, the present disclosure provides for a web based System where Investors are digitally matched (or connected) to a new financial product using GUI with embedded hyperlinks, requiring further action(s) (the "VIP Method") to continue and complete the purchase and provide for a deployment of an AI engine on a web-based application to aid in determining and/to identifying investment products related to user-specific information.

1) Better Targeted Investment Match System for Retail Investors Using Real Time Preferences and Behavior By Translating search engine results into API, either internally or from a third party digital site or third party API, and processing personal and financial data, social values and investment objectives using algorithms for matchmaking results, a product recommendation is made to a User for a personalized site experience on an automated web-based publishing platform, while learning from each Site Experience i.e. viewing history, search words or phrases, number of orders, size of orders, number of transactions, order characteristics (Special values and characteristics yes/no) etc. . . . (Collectively, the "Site Experience")

Queries are stored and new matches are created (or withdrawn) each time new data is added in the category, creating GUI display specific to each Users web and mobile display with embedded hyperlinks.

All personal data is saved and stored in a database ("User Profile Database"); User Profiles stored on password protected dashboards on a hosted server and/or pursuant to a web cloud service.

2) Introducing VIP Method

In addition to the User Profile, a User can further verify preferences, identification, location, objectives and goals by adding additional input into the VIP System and will be vetted using Artificial Intelligence, IOT, machine learning and site experience methods (as further described herein, collectively "VIP") to assess a more Buyer thoroughly. The Invention uses Artificial Intelligence (AI) and Machine Learning (ML) to demonstrate and support the assignment of a VIP status. This data is stored on the VIP Database and requires an elevated permission level and security.

This invention determines with reasonable assurances the Type of Buyer, financial wealth/health, investment objectives and goals, and a measurement for truthfulness from an previously unknown buyer online, requesting to purchase a specific product. This System also includes the pre-screening of a Buyer for suitability for a specific investment product.

A Rejected VIP user may modify inputs and values through the User Profile and resubmit or request virtual assistance VIP Users are assigned an internal underlying ID score (Private—For Internal Use Only) based on weighted average of personal data information, if qualified to proceed, a VIP status score is assigned to the User, only shared with VIP permission. Based on wealth factors and State+ Weighted average of values assigned to each of the following categories)

The following descriptions are for illustrative purposes only and is not intended to limit the scope, applicability or configuration of the this disclosure. Rather, the following description of the preferred exemplary embodiment(s) will provide those skilled in the art with an enabling description for implementing a preferred exemplary embodiment. It being understood that various changes may be made in the function and arrangements of elements without departing from the spirit and scope as set forth in the claims.

Matching investment objectives with subjective personal decision making in real time is built on a web-based system and network interface hosted by a server (i.e. C++, asp.net, mysql, Rest, etc) and includes but is not limited to, computer code, a structured combination of automated web server platform, hosted web server site, server storage databases, processors, API, algorithms, equations and gates, GUI including Display Modules for Image Interactive links embedded, and/or any other mechanism capable of containing information.

As securities are searched, matched, viewed, selected and (pre) ordered and/or purchase, the AI learns from some of the categories and identifies values to more closely target only appropriate investments for the User now and in the future. (i.e. Maturities are left out of the loop if 'building a ladder'), thereby saving the User time from eliminating the time required to search multiple sites and assess suitability and desire.

Automated Web Publishing Platform:

Product Data: For Search Engine and Match System: A database input fields and categories User for new issue fixed income securities either by an Issuer, a designated agent thereof, including but not limited to its MFA, Underwriter, or a legal representative OR by collected data, manually, or API, or any means computer generated; and a database of User profile information, including but not limited to risk tolerance, financial objectives, age, etc. . . . ; storage either in the cloud and/or on a server of the User information;

A method consistent with the invention may further include data input and database module and storage, sorting and filtering, administration module, comparing data, and using an AI engine and search engine.

A method consistent with the invention includes a system for storing and processing data stored in a central database accessible to multiple users, the multiple users to be authorized to control data access and viewing based on respective user permissions.

Machine Learning will allow the System to start generating further efficiencies as it starts to make out patterns from the Users by evaluating and aggregating the data. The product focus for products will narrow and improve with the System using ML as the algorithm, leaving only suitable Investments "Artificial Intelligence" is used herein to broadly describe any computationally intelligent systems that combine knowledge, techniques and methodologies.

Facilitate an anonymous user to use the Match System, providing additional User Data to achieve access to various levels services, i.e. Anonymous to Users to VIP to Sellers Databases:
1) New Issues—Assigning Characteristics and values to securities, Retrieved using API's or manually inputted; Upcoming Sales to be displayed on a unique URL only up to the [Sale Date]Rating, Price, Maturities, etc. . . . ; A Financial Products Database (Post), creating a unique temporary URL with interactive hyperlinks to relevant financial data and participating underwriters (Syndicate members).

A customized web address automatically and specifically-assigned from our proprietary, non-repeating database (on our server), created by an algorithm connecting strings of numbers, letters, and Issuer names from data storage system on server. The URL, and its associated Page, is unique to each New Issue collected in our database either manually, using an API or other computer generated field input, and the hyperlink is instantly activated to a specific Details Page upon submission from our internal server by the Administrator, an Issuer or an Issuers' Designated Representative or Authorized Third-Party ("Submitter"), depending on assigned user permissions. This Page can be edited or deleted at any time prior to its automatic removal server.

This customized URL (CURL) constitutes a New Identification (and Notification) System for centralizing pre-sale issues in one place and is to be used only in the time period. The System instantly provides a unique landing page embedded with pre-sale details, relevant data and financial hyperlinks to each New Issue prior to the sale of securities. This URL, or a shortened forwarded URL, is assigned a unique web address and a page is created, and is only available up to, and until, the final sale and award of the securities, at which time, the hyperlink is disconnected and any hyperlink to the page is deleted.

2) User Profile—Based on collected data during Registration; Series of queries creating a customer profile displayed in a web-based, password protected dashboard URL; May be modified by User User (Creates User Profile), including but not limited to, Age, State, Zip Code, Gender, Alumni College (i.e. Level of education)

3) VIP Users—Database of data collected for Users—from Profiles and site experience; USER Management MODULE: that is built within the system or integrated to an external CRM through an API.

4) Sellers—Sourcing the Sellers' contact modifiable information, data collection, User Rating System, and products from internal database and other third party API's Including but not limited to, Underwriter Firm Name, Contact Name, Phone, Etc. . . . . .

Consumer Application—Search and Match

Consumer application to query information from BU or third party API, developed by using existing database and routines from pages and business layer.

PROCESSOR(S)/ALGORITMS

One processor, or more, or combinations thereof compare categories from different databases to calculate and display Match Results; Collecting and processing quantitative experience(s) and values into characteristics.

The software application stored either in the cloud and/or hosted on a server or shared server, or any state of the art storage system to assign multiple values to each input field, and using proprietary algorithms—to the Input fields of each set of data points to find, sort and filter the characteristics of each for a data set to find a field of results identifying securities that will be of interest to the investor. Based on any further action by the Investor experience, the processor will perform method operations and learn from the selections (intelligent learning), the range and field of Profile inputs will be adjusted accordingly to further isolate appropriate results from future Inputs of financial product data.

Algorithms will be based on investment strategies for existing industry-based financial policies, criteria, concepts, and regulations and will be subject to evaluation, adjustment, modifications as the financial landscape evolves and changes. For instance, to comply as an 'Accredited Investor' as defined by the SEC or a 'Retail Investor', as defined by the MSRB will affect Match Results. As the definition changes, the application will be modified to reflect the new parameters, affecting User Match Results.

Machine learning from the Views, Saves and Not Saved activity from Users and User Feedback, Upload images, photos, videos, Computer Network, or data network, telephone, mobile network, human speech—File new account form, using Siri, Alesas, Dot, etc. . . . , GUI—Graphical Interface System—Click for action, action buttons, hyperlinks, User edits, modifies personal data and financial information, social values and other considerations, i.e. Bondtiles, ebondpage, munistars, Learns from the Experiences—ie.e. number of orders, number of transactions, order characteristics (Special values and characteristics yes/no) Smart, Intelligent Learning.

AI FOR VALIDATION OF VIP USERS USING SOCIAL DATA ONLINE

The System will create a "Classifier", an algorithm to approve (or reject) a VIP Account application prior to placing an order. Using ML, the Classifier can learn from the User Profile, past site activity, site experiences, leverage current information in the application, quantity and qualify user data and provide real time behavior of the VIP User information including, but not limited to the following:

LOCATION (Address): In order to show relevant Products, vet address (location) the website or mobile app may automatically identify the buyers location by State or Country or other segmented demographic using IP address mapping thru the web browser or from the GPS location coordinates if from a mobile device and compare it to the User location provided by User on its Profile accessible on a unique, password protected dashboard, defaulting to the User location in the User Profile. Verify location and/or GPS (IP)—Override if traveling. GPS or IP address—Dynamic vs static locations—move around alot? Would expect travelers vs. Office workers; User gives permissions, such as GPS on phone, access to other data on phone and IoT LOCATION OF AVAILABLE FUNDS: Confirm Bank balance(s) from viewing a financial aggregator API; API from User financial institutions (Aggregators); Users may already using account aggregation if you use online financial software or desktop financial software that pulls in or downloads data from multiple accounts.

INVESTMENT GOALS: Identify patterns in site experience

VALIDATE USER ID: Use Biometric Data (face, iris, fingerprints, Selfies etc. . . . ; upload a photo, selfie, biometric data, including but not limited to facial, eyes, or fingerprint recognition CONTACT INFO: Add links; Use IP address, IoT, facebook, linked in, social media to confirm First and Last Name. Auto respond (e-mail, call, text, mobile) to contact preference provided to confirm contact number. Configure computer to mandatory confirm VIP contacts by telephone (robocall or by service rep), text (robo or custom), and email, or any contact preference as provided by the User prior to approving VIP account.

MEASURE TRUTHFULNESS: Check for accuracy by Confirming intangibles, I.e. truthfulness, Risk Tolerance to Participate in more offerings and early orders; bonds as a percentage of portfolio, experience purchasing bonds, net income, net worth, value of home, age, risk tolerance, suitability to product), Based on Users personal approach to happiness, honesty and satisfaction; perceived financial security and achieving personal financial and social goals. Machine Learning: Learns from the Experiences—i.e. number of orders, number of transactions, order characteristics (Special values and characteristics yes/no)—Improve data Security by identifying fraudulent or suspicious experiences.

RETAIL (Y/N): Specific Security Match, site activity and past experience(s) (i.e. order history, Order size, etc.

RISK TOLERANCE: Add a question to Indicate perceived Risk Tolerance I.e. "If interest rates go up, prices go down. What will you do if rates go up significantly?" A) Sell B) Buy More or 3) Nothing LOCAL INVESTOR (Y/N); Matching ZIPCODE, gps, IP Address with location of Issuer.

OTHER: Values and Human emotions— based on facial expressions and test results and social media activity on the internet, including but not limited to entries on social media platforms and search platforms such as FACEBOOK (Facial recognition & ID, marital status, family size, age, education level), TWITTER, AMAZON, GOOGLE, ZILLOW (Home value), and INSTAGRAM, LINKEDIN (employment), as well as voice recognition technology I.e. and ALEXA, SIRI, etc.i.e "Show me all upcoming bond sales in California next week rated A or better". Taking learned site activity and experience, behavioral insights and personalized investment tools. Understanding client preferences in the areas of loss aversion, present bias and hedonomics (one's own approach to pleasure).

While the invention is exemplified and discussed herein with reference to new issue bonds and IPO's, selling at identical prices by multiple broker-dealers at the same time, those skilled in the art will appreciate that the present invention is equally applicable to other types of financial products, securities and debt instruments, such as preferred stock, corporate bonds, municipal bonds, Mutual Funds, ETF's, Certificates of Deposit, etc. . . . . It may also extend to any product that may be offered to customers at a restricted manufacturer purchase prices to protect a brand or product, included but not limited to such mass produced products as cars, beauty products, fashion, appliances, etc. . . . where the Listing price can not be discounted or product offered at higher or lower price during any pre-specified time duration.

Seller Interface and Routing Orders Online

System reformatting and Integrating with Sellers Interface (API)—Processor for VIP Database to send data pre-populate Sellers Client Database and CRM; creating API from VIP data collector to process and send to Sellers CRM; Universal Account Form for Sellers—(customizable?) API that can be used by all Sellers thru a developer portal to receive VIP data for specific users investing in specific financial products on demand online.

User Profile Data+VIP Data=API for Authorized Sellers

The System and Method will create a vetting "classifier", an algorithm to approve the VIP application prior to placing an order. Using AI, the Seller will receive reasonable assurances of accurate data provided. Using ML, the VIP classifier will learn from past inputs, site activity, leverage current information inputs, and quantify and qualify user data.

Connect to Syndicate Members, or Intermediaries

The System is designed to offer the Buyer a connection to one, or multiple financial institutions participating in a new issue (Syndicate Members), or intermediaries (i.e RIA's) upon request, using any state of the art communications methods available, at the direction of the VIP User, including text, mobile, web-based, electronically, or telephone.

The software application stored either in the cloud and/or hosted on a server or shared server, or any state of the art storage system to assign multiple values to each input field, and using proprietary algorithms—to the Input fields of each set of data points to find, sort and filter the characteristics of each for a data set to find a field of results identifying securities that will be of interest to the investor. Based on any further action by the Investor experience, the processor will perform method operations and learn from the selections (intelligent learning), the range and field of Profile inputs will be adjusted accordingly to further isolate appropriate results from future Inputs of financial product data.

Measure Customer Truthfulness Online

Truthfulness Measurement:

A proprietary goals and values-based wealth management/investment technology, specifically for income producing financial products I.e. bonds, cd's, ETF's, mutual funds where honesty and truthfulness is a valued trait for the Buyer.

Using account aggregation to get a snapshot of all financial accounts while being able to easily retrieve account details, such as recent transactions, in one place. Using this feature, the User can upload one of its website to see all their financial accounts. It saves having to log in to several accounts to tally up a financial overview. When you log into your software with your password, the software uses the aggregation service to securely present login information and passwords to all of the individual financial institutions that hold your accounts. Data for each account are then downloaded, or "scraped," making them all viewable by you in one glance.

The invention claimed is:

1. An identification and notification system for centralizing current data pre-sale issues of new issue bonds in one place and usable only prior to a date the new issue bonds are formally awarded to underwriters, said identification and notification system comprising:

a local investor computer generating investor profile data on a web-based computer network for qualified investors;

at least one sorting and filtering scheme;

a remote server comprising a new issue database and coupled to said local investor computer and to said web-based computer network, and configured such that the new issue database stores new issue data comprising investor profile data, characteristics for new issue bonds, and the sorting and filtering scheme, each of which is accessible to the database of the remote server using internal or third party application programming interfaces (APIs);

said remote server configured to match one or more of said qualified investors to one or more new issue bonds according to the sorting and filtering scheme by matching the investor profile data to the characteristics for new issue bonds;

said remote server configured to assign a new, unique and temporary, ephemeral Universal Resource Locator (URL), and associated unique landing web-page, to each proposed sale of new issue bonds in the new issue database storing the new issue data, and to input fields in the unique landing webpage with the new issue data stored in the new issue database, and with the URL configured for identification prior to a final sale date of the new issue bonds and searchable on a website, wherein the URL is generated, updated and stored upon completing field entries for Hypertext Markup Language (HTML) data input for each new issue to the new issue database, and wherein the URL is removed or redirected and the webpage is no longer visible, available or accessible immediately following the sale date or cancellation by an issuer or underwriter, and the data is archived at least until the issue has successfully closed.

2. The identification and notification system of claim 1 wherein the investor profile data generated from the local investor computer comprises data from social media, investing habits, bank balances, marital status, employment status, age, biometric identifiers, retirement age, home value, computer location, and net income.

3. The identification and notification system of claim 1 further comprising a vetting classifier algorithm configured to compare the investor profile data to user input data manually inputted by the user to determine a level of truthfulness of a user regarding user authentication and the investment experience, objectives, and financial status of the user.

4. The identification and notification system of claim 3 wherein the vetting classifier algorithm, through the comparison of the investor profile data to the user input data and the determination of a level of truthfulness, is further configured to determine whether a user has permission to access the new, unique and temporary, ephemeral URL, and associated unique landing web-page.

5. The identification and notification system of claim 1 wherein the matching of the investor profile data to the characteristics for new issue bonds occurs in real time according to any changes in the investor profile data and/or the characteristics for new issue bonds.

6. The identification and notification system of claim 1 wherein the new issue data comprises a description, a state, a tax treatment, a maturity, and a rating for each new issue bond.

* * * * *